US012573763B1

(12) United States Patent
Miers

(10) Patent No.: US 12,573,763 B1
(45) Date of Patent: Mar. 10, 2026

(54) EXTENDED BANDWIDTH EMBEDDED SURFACE WAVE ANTENNA INCORPORATING A FREQUENCY SELECTIVE SURFACE

(71) Applicant: BAE Systems Space & Mission Systems Inc., Broomfield, CO (US)

(72) Inventor: Joshua Thomas Miers, Arvada, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 142 days.

(21) Appl. No.: 18/512,197

(22) Filed: Nov. 17, 2023

Related U.S. Application Data

(60) Provisional application No. 63/430,221, filed on Dec. 5, 2022.

(51) Int. Cl.
*H01Q 15/00* (2006.01)

(52) U.S. Cl.
CPC ................................ *H01Q 15/0026* (2013.01)

(58) Field of Classification Search
CPC ...... H01Q 1/38; H01Q 15/00; H01Q 15/0013; H01Q 15/0026; H01Q 15/16
See application file for complete search history.

(56) References Cited

U.S. PATENT DOCUMENTS

| | | | |
|---|---|---|---|
| 2,648,002 | A | 8/1953 | Eaton |
| 2,822,542 | A | 2/1958 | Butterfield |
| 2,852,775 | A | 9/1958 | Zisler et al. |
| 2,985,877 | A | 5/1961 | Holloway |
| 3,099,836 | A | 7/1963 | Carr |
| 3,611,395 | A | 10/1971 | Carberry |
| 3,868,694 | A | 2/1975 | Meinke |
| 4,001,834 | A | 1/1977 | Smith |
| 4,010,475 | A | 3/1977 | James |
| 4,087,822 | A | 5/1978 | Maybell et al. |
| 4,162,499 | A | 7/1979 | Jones, Jr. et al. |
| 4,170,013 | A | 10/1979 | Black |
| 4,187,507 | A | 2/1980 | Crane et al. |
| 4,197,544 | A | 4/1980 | Kaloi |
| 4,353,074 | A | 10/1982 | Monser et al. |

(Continued)

OTHER PUBLICATIONS

Park et al., "An Ultra-Wideband Microwave Radar Sensor for Characterizing Pavement Subsurface," IEEE MTT-S Digest, IFWE-63, 2003, pp. 1443-1446.

(Continued)

*Primary Examiner* — Tho G Phan
(74) *Attorney, Agent, or Firm* — Sheridan Ross P.C.

(57) ABSTRACT

Embedded surface wave antenna elements incorporating a frequency selective surface, antenna systems incorporating one or more embedded surface wave antenna elements incorporating a frequency selective surface, and methods for providing an antenna element or antenna system capable of operating over an extended frequency range. In the antenna element, the frequency selective surface is arranged between a feed and portions of a ground plane forming an antenna element volume. The frequency selective surface is configured to pass signals within a relatively low frequency range, and to reflect signals at frequencies above that low frequency range. Multiple frequency selective surfaces can be included, each having a different stop band.

20 Claims, 9 Drawing Sheets

(56) References Cited

U.S. PATENT DOCUMENTS

| | | | | |
|---|---|---|---|---|
| 4,370,657 | A | | 1/1983 | Kaloi |
| 4,401,988 | A | | 8/1983 | Kaloi |
| 4,415,900 | A | | 11/1983 | Kaloi |
| 4,835,543 | A | | 5/1989 | Sequeira |
| 4,839,659 | A | | 6/1989 | Stern et al. |
| 4,879,562 | A | | 11/1989 | Stern et al. |
| 4,931,808 | A | | 6/1990 | Lalezari et al. |
| 5,126,751 | A | | 6/1992 | Wada et al. |
| 5,389,937 | A | | 2/1995 | Kaloi |
| 5,465,100 | A | | 11/1995 | Remondiere et al. |
| 5,471,221 | A | | 11/1995 | Nalbandian et al. |
| 5,561,435 | A | | 10/1996 | Nalbandian et al. |
| 5,589,842 | A | | 12/1996 | Wang et al. |
| 5,734,350 | A | | 3/1998 | Deming et al. |
| 5,982,339 | A | * | 11/1999 | Lalezari ............ H01Q 15/0013 343/705 |
| 6,133,880 | A | | 10/2000 | Grangeat et al. |
| 6,154,175 | A | | 11/2000 | Yee |
| 6,292,143 | B1 | | 9/2001 | Romanofsky |
| 6,304,220 | B1 | | 10/2001 | Herve et al. |
| 6,359,588 | B1 | | 3/2002 | Kuntzch |
| 6,593,887 | B2 | | 7/2003 | Luk et al. |
| 6,759,985 | B2 | | 7/2004 | Acher et al. |
| 6,768,456 | B1 | | 7/2004 | Lalezari et al. |
| 6,882,316 | B2 | * | 4/2005 | McKinzie, III .... H01Q 15/0013 343/909 |
| 6,949,995 | B2 | | 9/2005 | Choi et al. |
| 6,980,171 | B2 | | 12/2005 | Maruyama et al. |
| 7,595,765 | B1 | | 9/2009 | Hirsch et al. |
| 7,629,937 | B2 | | 12/2009 | Lier et al. |
| 8,736,502 | B1 | | 5/2014 | Langfield et al. |
| 9,882,286 | B1 | * | 1/2018 | Tonn .................. H01Q 15/0086 |
| 10,396,461 | B2 | * | 8/2019 | Kasemodel ............ H01Q 21/24 |
| 10,826,187 | B1 | * | 11/2020 | Godard .................... H01Q 5/50 |
| 2002/0089457 | A1 | | 7/2002 | Mehltretter |
| 2004/0104847 | A1 | | 6/2004 | Killen et al. |
| 2004/0140945 | A1 | | 7/2004 | Werner et al. |
| 2004/0201526 | A1 | | 10/2004 | Knowles et al. |
| 2006/0017642 | A1 | | 1/2006 | Herzer et al. |
| 2007/0085757 | A1 | | 4/2007 | Sievenpiper |
| 2010/0066629 | A1 | | 3/2010 | Sievenpiper |

OTHER PUBLICATIONS

Nguyen et al., "Ultra-Wideband Microstrip quasi-horn antenna," Electronic Letters, vol. 37, No. 12, Jun. 7, 2001, pp. 731-732.

* cited by examiner

EXTENDED BANDWIDTH EMBEDDED SURFACE WAVE ANTENNA INCORPORATING A FREQUENCY SELECTIVE SURFACE

CROSS-REFERENCE TO RELATED APPLICATION

This application claims the benefit of U.S. Provisional Patent Application Ser. No. 63/430,221, filed Dec. 5, 2022, the entire disclosure of which is hereby incorporated herein by reference.

FIELD

Systems and methods featuring an embedded surface wave antenna incorporating a frequency selective surface and having an extended bandwidth and favorable beam pattern characteristics are provided.

BACKGROUND

In designing antenna structures, it is desirable to provide appropriate gain, bandwidth, beamwidth, sidelobe level, radiation efficiency, aperture efficiency, radar cross-section (RCS), radiation resistance and other electrical characteristics. It is also desirable for these structures to be lightweight, simple in design, inexpensive and unobtrusive, since an antenna is often required to be mounted upon or secured to a supporting structure or vehicle, such as high velocity aircraft, missiles, rockets or even artillery projectiles, which cannot tolerate excessive deviations from aerodynamic shapes. It is also sometimes desirable to hide the antenna structure so that its presence is not readily apparent for aesthetic and/or security purposes. Accordingly, it is desirable that an antenna be physically small in volume and not protrude on the external side of a mounting surface, such as an aircraft skin, while exhibiting all the requisite electrical characteristics.

One type of antenna that has been successfully used for broadband conformal applications is an embedded surface wave antenna known as the Doorstop™ antenna. The Doorstop™ antenna belongs to a class of antennas known as traveling wave antennas. Examples of other traveling wave antennas are polyrod, helix, long-wires, Yagi-Uda, log-periodic, slots and holes in waveguides, and horns. Antennas of this type have very nearly uniform current and voltage amplitude along their length. This characteristic is achieved by carefully transitioning from the element feed and properly terminating the antenna structure so that reflections are minimized. Examples of Doorstop™ antennas are found in U.S. Pat. Nos. 4,931,808 and 7,595,765, both of which are assigned to the assignee of the present disclosure.

A Doorstop™ antenna generally comprises a feed placed over a dielectric wedge, a ground plane supporting or adjacent to the dielectric wedge, and a cover or radome. The Doorstop™ antenna has two principal regions of radiation that affect patterns: the feed region and the lens region. The size and shape of these two regions generally control bandwidth and pattern performance.

In a typical Doorstop™ antenna, the measured voltage standing wave ratio (VSWR) improves with increasing frequency. At reduced frequencies the Doorstop™ element is electrically too short and functions more like a bent monopole antenna. The low frequency limit for the Doorstop™ element is set by the electrical depth of the element. More particularly, the maximum wedge depth and wedge dielectric constant determine the lowest frequency of operation. Once the physical depth and dielectric constant of the wedge are established, the lens to feed length ratio of the basic Doorstop™ configuration determines the pattern performance. At low frequencies, the pattern tends to look very uniform and nearly omni-directional, while at high frequencies the pattern becomes quite directional or end-fired. Additionally, at high frequencies the pattern develops a characteristic null at the zenith that moves forward toward the horizon as the frequency increases. For certain applications and greater operating bandwidths, this characteristic pattern performance is undesirable.

Within about a 3 to 1 operating bandwidth, the pattern characteristic can be controlled by adjusting the lens to feed length ratio of the antenna. As the frequency increases above the 3 to 1 ratio, the lens becomes electrically long, producing field components that either support or interfere with the radiation from the feed region. This leads to the creation of nulls in the forward portion of the far field elevation plane pattern.

In order to reduce reflections that can occur at low frequencies, the Doorstop™ antenna design has been modified to incorporate a radar absorbing material (RAM) or other lossy material in the feed region of the antenna element. The lossy material can also be combined with a feed mirror to further improve low frequency performance. The basic design has also been modified to incorporate a lens perturbation feature to control the shape of the wave or phase front of a signal. The lens perturbation feature can include volumes of differential dielectric material within the lens portion of the antenna. The lens perturbation feature can be provided as a wedge of dielectric material having a relatively low dielectric constant that is inserted in a forward portion of the lens region, while the remaining portion of the lens region incorporates a dielectric material having a relatively high dielectric constant. A lens perturbation feature can also be provided by shaping the ground plane in the lens region of the antenna element to control the shape of the phase front. As still another modification, the antenna can be provided with a buried feed feature in which the feed is covered by relatively low dielectric constant material in a feed region or on a feed side of the feed element. The lens region on a side of the feed element opposite the feed side incorporates a dielectric material having a relatively high dielectric constant. In addition, an antenna element with a buried feed may provide a coaxial or other connector for interconnecting the feed element to a transmission line that lies under the dielectric material generally filling the volume defined by the ground plane.

Although such previous designs have been successful at extending various favorable operating characteristics of a typical Doorstop™ antenna, additional improvements, including extensions to the operating bandwidth of the antenna that could be implemented without requiring multiple, different dielectric materials, would be desirable.

SUMMARY

Embodiments of the present disclosure are directed to providing antenna elements, antenna systems incorporating one or more antenna elements, and methods for providing an antenna system with improved characteristics. In accordance with embodiments of the present disclosure, travelling wave or conformal travelling wave antenna elements having extended operating frequency bandwidths are provided. The extension of the bandwidth achieved by embodiments of the present disclosure is realized by providing one or more embedded frequency selective surfaces within the element, creating two or more feed or radiating regions in the antenna. More particularly, the multiple radiating regions formed by the inclusion of an embedded frequency selective surface effectively support different sections of the overall operating bandwidth of the antenna. Systems and methods in accordance with embodiments of the present disclosure therefore enable effective operation of a travelling wave antenna, including a Doorstop™ antenna, over an extended bandwidth, and do so without requiring the inclusion of multiple, different dielectric materials.

An antenna element in accordance with embodiments of the present disclosure includes a ground plane that defines at least some boundaries of an antenna element volume. A feed of the antenna element extends over a portion of a first side of the antenna element volume. The antenna element additionally includes a first frequency selective surface disposed between at least a portion of the ground plane and the feed. The first frequency selective surface is configured to pass a signal having a frequency within a first frequency range and to reflect a signal within a second frequency range, where the first frequency range is lower than the second frequency range. In accordance with at least some embodiments of the present disclosure, multiple frequency selective surfaces can be included in a single antenna element.

An antenna system in accordance with embodiments of the present disclosure can include one or more antenna elements. Each antenna element of the antenna system includes a ground plane that defines an antenna element volume, a feed, and one or more frequency selective surfaces disposed between at least a portion of the ground plane and the feed. Moreover, each antenna element of the antenna system can be configured as a conformal element of a vehicle or other structure.

A method for providing an antenna element in accordance with embodiments of the present disclosure includes determining a desired operating bandwidth for the antenna element. The dimensions of the antenna element can be determined from the desired operating bandwidth. A ground plane is configured to accommodate the determined dimensions of the antenna element and to form an antenna element volume suitable for signals within a first range of frequencies encompassing a lowest frequency within the desired operating bandwidth. A determination can then be made as to whether signals having frequencies within a second range of frequencies that are higher than the first range of frequencies are adequately supported by the antenna element. If signals having frequencies within the second range of frequencies are not adequately supported, a frequency selective surface having a stop band that is at or above the highest frequency within the first range of frequencies is provided and is disposed between a feed element of the antenna element in at least portions of the ground plane. Methods in accordance with embodiments of the present disclosure can further include determining a desired coverage area or volume, and disposing multiple antenna elements about a vehicle or structure to obtain to the desired coverage area or volume.

In accordance with embodiments of the present disclosure, the inclusion of a low pass frequency selective surface (FSS) presents an antenna lens area with a reduced volume to frequencies higher than the passband of the FSS. More particularly, the FSS has a stop band at a frequency that corresponds to a lowest frequency of a band at which the reduced volume defined at least in part by that FSS is configured to operate. Frequencies that are lower than the stop band, and that are thus within the passband of the FSS are allowed to pass through the FSS, and can therefore access the volume behind the FSS. Accordingly, where a single FSS is provided, frequencies within the passband of that single FSS can access the full extent of the lens volume of the antenna. Where multiple FSS structures are provided, each successive FSS, moving away from the feed, presents a low pass filter having a lower stop band than a previous FSS. Accordingly, embodiments of the present disclosure enable multiple operating bands to be supported by a single antenna structure. Moreover, the multiple operating bands can be matched to provide an antenna that features an extended operating bandwidth as compared to previous antenna configurations.

Additional features and advantages of embodiments of the present disclosure will become more readily apparent from the following description, particularly when taken together with the accompanying drawings.

DETAILED DESCRIPTION

Embodiments of the present disclosure are generally directed to providing antenna elements capable of operating over a wide range of frequencies and that are particularly well suited for conformal applications. More particularly, embodiments of the present disclosure provide design features that assist in improving the performance of embedded surface wave antenna elements. This improved performance can include providing more favorable bandwidth and radiation performance in areas of interest than would otherwise be available from a comparable embedded surface wave antenna element. Certain of the design features are particularly effective at improving performance at low frequencies, while other design features are particularly effective at improving performance at high frequencies. As used herein, "low frequencies" and "high frequencies" are not limited to any particular frequency ranges. Instead, these terms respectively apply to the low end and the high end of the overall range of operating frequencies of the antenna element. In addition, through the application of features in accordance with embodiments of the present disclosure, the useful overall operational bandwidth of an antenna element can be improved as compared to an antenna element that did not benefit from the inclusion of such features. Embodiments of the present disclosure can also provide improvements to the beam patterns at the low and/or high frequency ends of the overall operating range as compared to alternative configurations.

Figure 1:
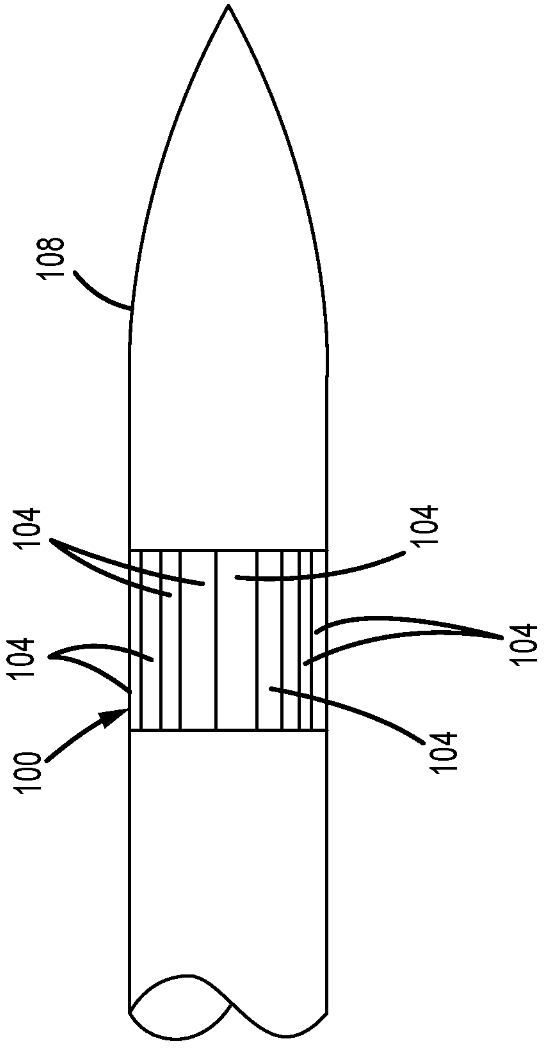
FIG. 1 is a partial side view of a vehicle incorporating a number of antenna elements in accordance with embodiments of the present disclosure.

With reference to FIG. 1, an antenna array or system 100 comprising a plurality of antenna elements 104 in accordance with embodiments of the present disclosure, incorporated into a vehicle 108, is depicted. Although the vehicle 108 in this example is a missile having a cylindrical body, such as an advanced radar tracking air-to-air missile, this is just one example of the type of vehicle that can be associated with one or more antenna elements 104 as described herein. Other examples include aircraft, spacecraft, satellites, ships, tanks, trucks, motor vehicles, and artillery projectiles. Furthermore, embodiments of the present disclosure are not limited to being associated with a vehicle 108, and can instead be associated with stationary or man-portable applications. Antenna elements 104 in accordance with embodiments of the present disclosure are particularly, although not solely, useful in connection with any application that requires or can benefit from a conformal or substantially conformal antenna element. Furthermore, a number of antenna elements 104 having forward-looking and side-looking beam coverage can be arrayed about the periphery of a vehicle 108 or other structure, for example to provide a composite hemispherical coverage volume or beam. As can be appreciated by one of skill in the art, the number of antenna elements 104 included in an antenna system 100 can be selected based on considerations such as the frequency band of operation and the desired coverage region. For instance, as depicted in FIG. 1, a number of antenna elements 104 can be disposed about the circumference of a cylindrical vehicle 108 body to provide a desired coverage volume. As a further example, an antenna system 100 can include a single antenna element 104.

Figure 2:
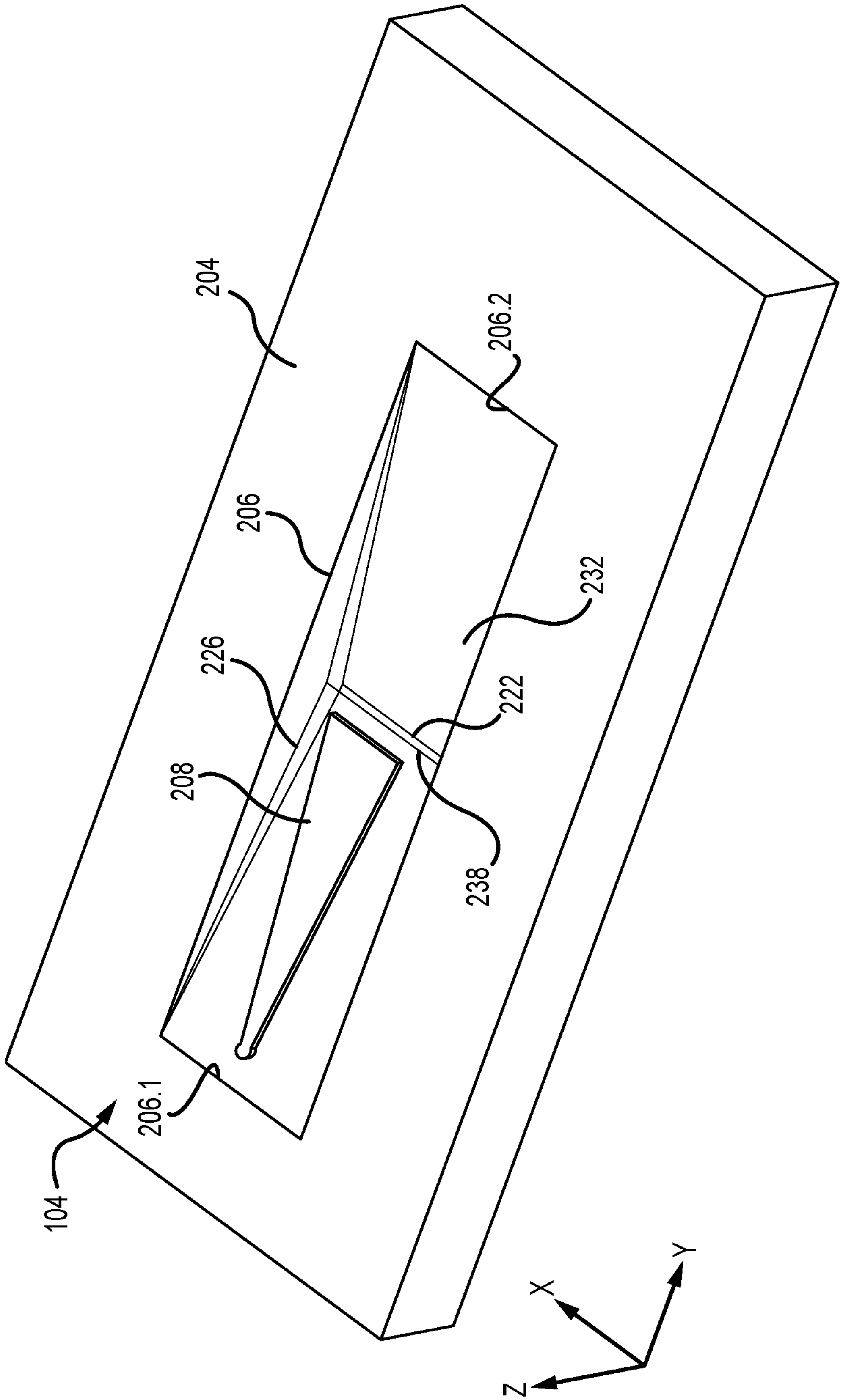
FIG. 2 is a perspective view of an antenna element in accordance with embodiments of the present disclosure.
Figure 3:
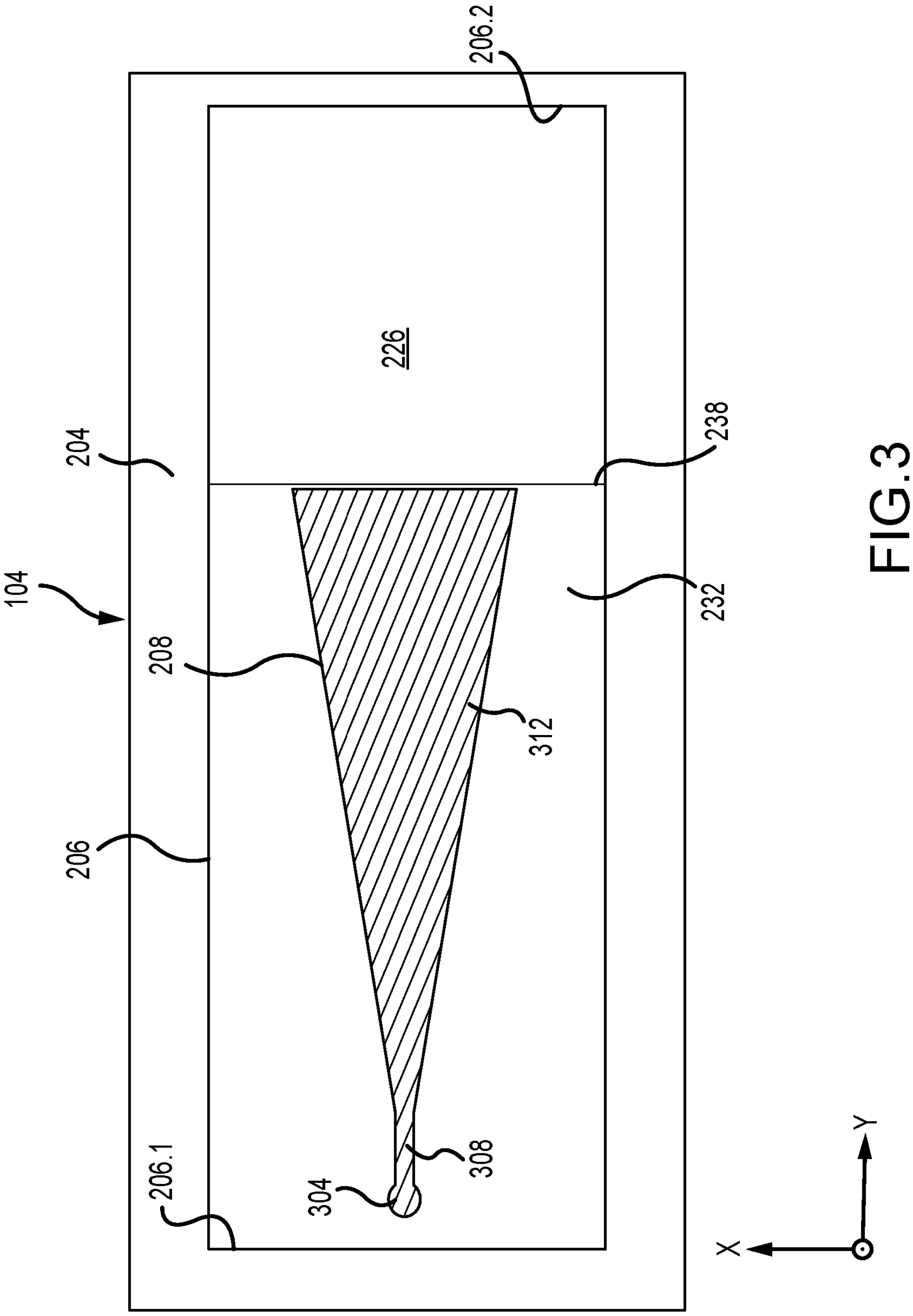
FIG. 3 is a plan view of a portion of an antenna element in accordance with embodiments of the present disclosure.
Figure 4:
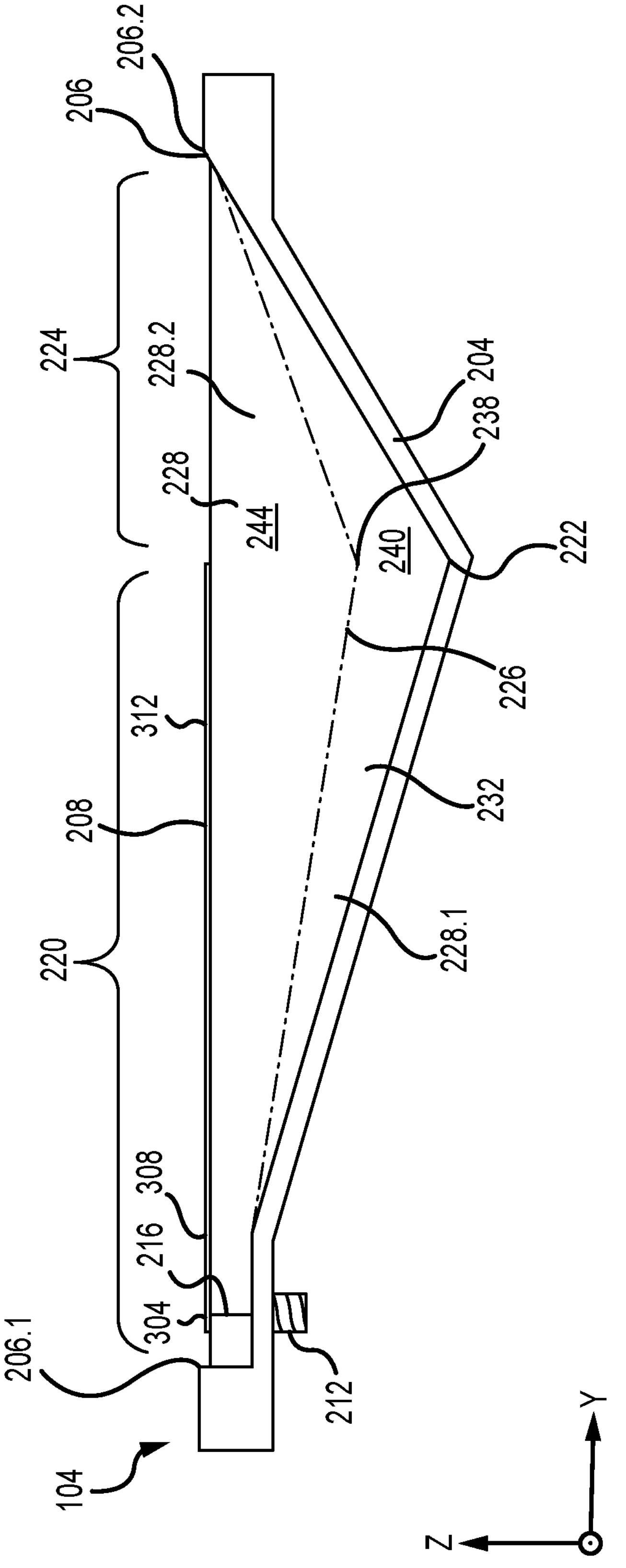
FIG. 4 is a cross-section in elevation of an antenna element in accordance with embodiments of the present disclosure.

FIGS. 2, 3, and 4 are perspective, plan, and cross-section views respectively of an antenna element 104 in accordance with embodiments of the present disclosure. The antenna element 104 generally includes a ground plane or structure 204 and a feed 208. The ground plane 204 can comprise an electrically conductive structure or body extending to the sides of the antenna element 104, and defines an aperture 206 in a top or upper surface of the ground plane 204 that can correspond to an outer surface of vehicle 108 or other structure incorporating the antenna element 104. Accordingly, the ground plane 204 can comprise at least a portion of a structural component of a vehicle 108 or other structure. In addition, an area of the aperture 206 and a surface of the ground plane 204 within the area of the aperture define the boundaries of an antenna element volume 232.

Considered in the plan view (see FIG. 3), the area defined by the aperture 206 generally surrounds the feed 208 and other components of the antenna element 104. The feed 208 generally includes an electrically conductive feed, for example a metalized feed, and can have a tapered form. More particularly, in at least some embodiments, the feed 208 can include a circular section as a pad 304 for a probe style feed at a proximal end of the feed 208, a microstrip feed section 308 that is appropriately sized to be impedance matched to the impedance of the probe or connecting equipment, and a transverse electromagnetic flair section 312 forming a broadband transition to support a broadband traveling magnetic wave toward a distal end of the feed 208. In accordance with further embodiments of the present disclosure, the electromagnetic flair section 312 can instead be configured as a crow's foot type feed.

With particular reference to FIG. 4, the region of the antenna element 104 that includes the proximal end of the antenna element 104 and that contains the feed 208 is generally defined as the feed region 220. The region of the antenna element 104 that includes the distal end of the antenna element 104 is generally defined as the lens region 224. In accordance with embodiments of the present disclosure, a connector 212 is provided at or towards the proximal end of the antenna element 104. Typically, the connector 212 allows the signal line 216 of a coaxial cable or other transmission line to be connected to the feed 208, either directly or through an intermediate conductor.

As best shown in FIGS. 2 and 4, within the area of the aperture 206, and with distance from a proximal end 206.1 of the aperture 206, the ground plane 204 extends away from the feed 208 in a length direction (i.e. the +Y direction in the figures) and downward in a depth direction (i.e. the −Z direction in the figures), reaching maximum depth near a distal end of the feed region 220, at or about an interface between the feed region 220 and the lens region 224. Accordingly, a distance between the feed 208 and the portion of the ground plane 204 underlying the feed 208 increases with distance from the proximal end 206.1 of the aperture 206, until or near the interface between the feed region 220 and the lens region 224, and at a line or area of inflection 222. From the line or area of inflection 222, the ground plane 204 continues to extend in the length direction (i.e. in the +Y direction in the figures), but moves upward in the depth direction (i.e. in the +Z direction in the figures). Accordingly, a distance between a plane along which the feed 208 is disposed and the underlying portions of the ground plane 204 decreases with distance from the proximal end of the aperture 206.1. An antenna element volume 232 bounded by the ground plane 204 and a plane on which the feed 208 is disposed, along a length of the aperture 206 (i.e. from the proximal end 206.1 of the aperture 206 to a distal end 206.2 of the aperture 206), and within a width of the aperture 206, is mostly or entirely occupied by a dielectric material 228 that generally fills all or a portion of the antenna element volume 232. Note that in FIG. 2 the dielectric material 228 is treated as a transparent feature (or alternatively depicts the antenna element 104 with the dielectric material 228 removed), to provide a view of portions of the ground plane 204 that would otherwise be obscured. A radome (not shown) that extends over the antenna element 104 can also be provided, for example to provide a surface that conforms to the exterior surface of a vehicle 108 incorporating the antenna element 104, and to protect the feed 208 and other components of the antenna element 104.

An antenna element 104 in accordance with embodiments of the present disclosure also includes a frequency selective surface 226 that extends through the antenna element volume 232, between a plane or surface containing the feed 208 and a surface of the ground plane 204 within the area of the aperture 206, dividing the antenna element volume 232 into a first or low frequency region 240 and a second or high frequency region 244. The contour of the frequency selective surface 226 in the elevation view generally mirrors that of the ground plane 204 within the area of the aperture 206, but at a shallower angle. For example, the frequency selective surface 226 can extend in a length direction (i.e. in a +Y direction in the figures) from a proximal end and downward in the depth direction (i.e. in a −Z direction in the figures) to a line or area of inflection 238 that is adjacent or near the line of inflection 222 of the ground plane 204, and then continues in the length direction (i.e. in the +Y direction in the figures) and upward in the depth direction (i.e. in the +Z direction in the figures) to a distal end of the frequency selective surface 226.

In accordance with embodiments of the present disclosure, the frequency selective surface 226 is a low pass filter element having a stop band that encompasses a high frequency operating band of the antenna element 104, and a pass band that encompasses a low frequency operating band of the antenna element 104. More particularly, the frequency selective surface 226 is tuned to act electromagnetically as a conductor with respect to signals with frequencies encompassed by the stop band, while allowing signals with frequencies below that stop band to pass, and thus access the low frequency region 240, corresponding to the entire antenna element volume 232. Accordingly, the frequency selective surface 226 passes signals having frequencies within the passband or first frequency range, and reflects signals having frequencies within the stop band or second frequency range. As can be appreciated by one of skill in the art after consideration of the present disclosure, the tuned, low pass frequency selective surface 226 presents a high frequency region 244 having a relatively shallow antenna element 104 depth to signals within the high frequency operating band of the antenna element 104, while allowing signals within the low frequency operating band of the antenna element 104 to pass and to thereby access the full extent of antenna element volume 232. This configuration thus allows the antenna element 104 to provide favorable characteristics when operating at frequencies within the low frequency range of the antenna element 104, while preventing overmoding that might otherwise occur when operating at frequencies within the high frequency range of the antenna element 104.

In accordance with embodiments of the present disclosure, a first portion of dielectric material 228.1 is disposed between the ground plane 204 and the frequency selective surface 226. The first portion of the dielectric material can fill the portion of the antenna element volume 232 that lies between the ground plane 204 and the frequency selective surface. Moreover, the frequency selective surface 226 can be disposed directly on and can be supported by the first portion of the dielectric material 228.1. In addition, a second portion of the dielectric material 228.2 can be disposed between the feed 208 and the frequency selective surface 226. In accordance with at least some embodiments of the present disclosure, the second portion of the dielectric material 228.2 generally fills a portion of the antenna element volume 232 between the frequency selective surface 226 and a line extending along a length of the aperture 206 formed in the ground plane 204. The feed 208 can be disposed directly on and can be supported by the second portion of the dielectric material 228.2. In accordance with at least some embodiments of the present disclosure, the first 282.1 and second 282.2 portions of dielectric material 228 can include the same dielectric material 228. In accordance with other embodiments of the present disclosure, the first 282.1 and second 282.2 portions of dielectric material can have different characteristics and/or can be formed from different materials. As an example, the dielectric material 228 may be a radar absorbing (RAM) material.

Figure 5:
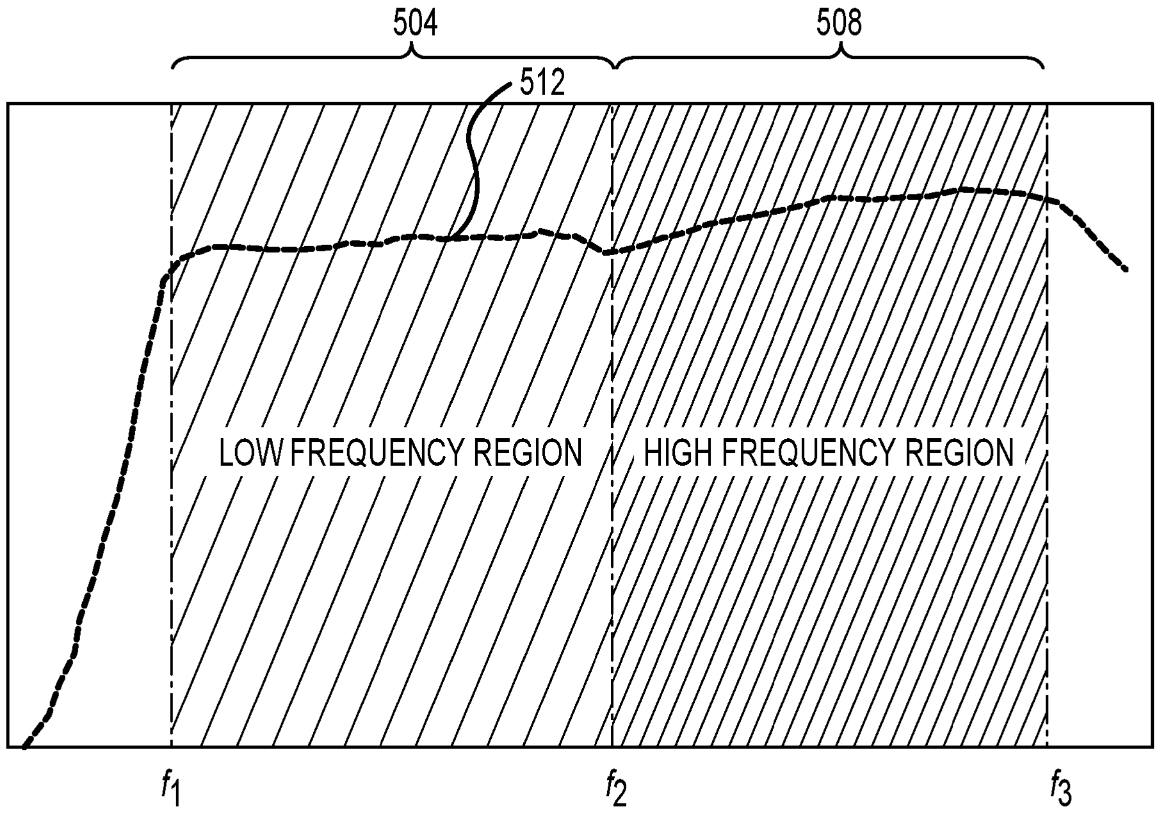
FIG. 5 is a graph depicting the frequency response of an antenna element in accordance with embodiments of the present disclosure.

With reference now to FIG. 5, performance characteristics of an antenna element 104 in accordance with embodiments of the present disclosure are depicted. In particular, whether operating in a relatively low frequency operating band 504, extending from frequency $f_1$ to $f_2$, or in a relatively high frequency operating band 508, extending from frequency $f_2$ to $f_3$, the gain of the antenna element 104, represented in FIG. 5 by the dotted line 512, remains more or less consistent. This is because the frequency selective surface 226 appears transparent or essentially transparent to frequencies within the low frequency operating band, allowing signals within that band to access the low frequency region 240 of the antenna element 104, corresponding to the full antenna element volume 232. The frequency selective surface 226 appears electrically conductive and thus as a reflector to frequencies within the high frequency operating band, limiting signals within that band to the smaller high frequency region 244.

Figure 6:
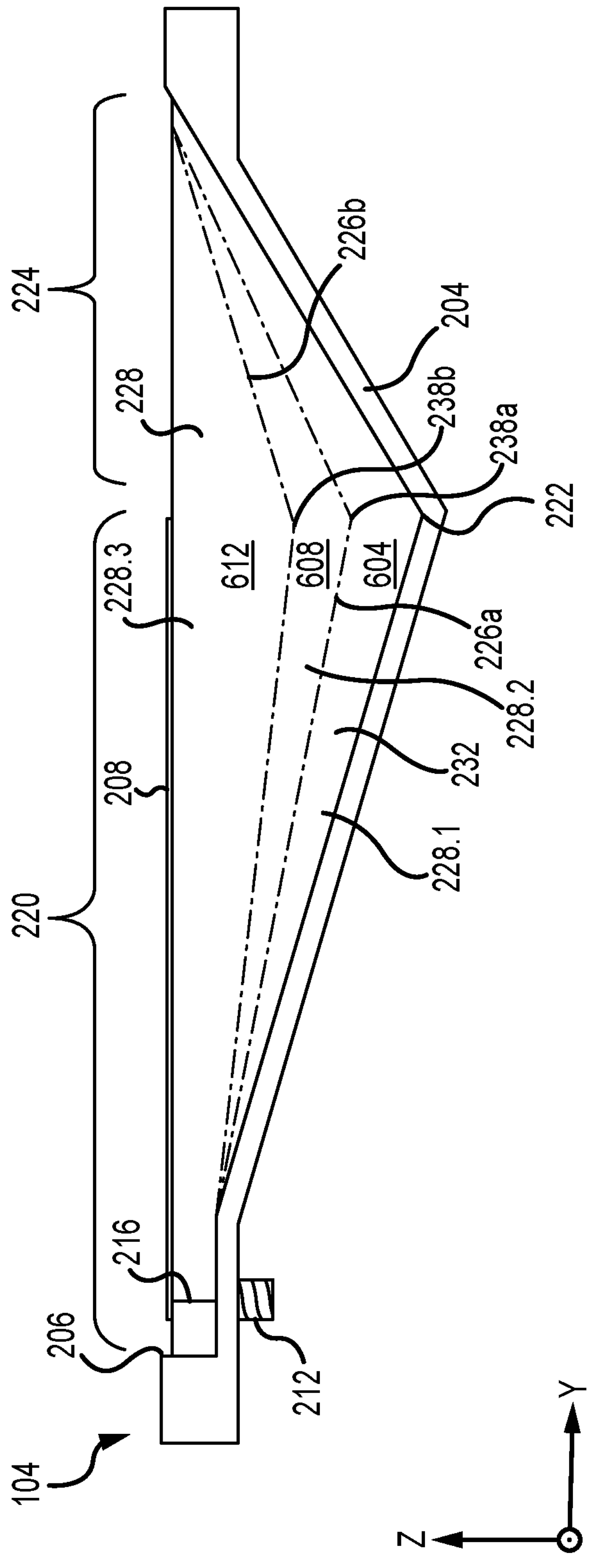
FIG. 6 is a cross-section in elevation of an antenna element in accordance with other embodiments of the present disclosure.

FIG. 6 depicts an example of an antenna element 104 in accordance with other embodiments of the present disclosure. In this example, an antenna element 104 with first **226*a* and second 226*b* frequency selective surfaces is depicted. The first frequency selective surface 226*a* is generally disposed between the second frequency selective surface 226*b* and the ground plane 204. Each of the frequency selective surfaces 226*a* and 226*b* can generally follow a contour of the ground plane 204, with an angle of inflection at a line or area of inflection 238*a* of the first frequency selective surface 226*a* being greater than an angle of inflection at a line or area of inflection 238*b* of the second frequency selective surface 226*b*. In accordance with embodiments of the present disclosure, the frequency selective surfaces 226*a* and 226*b* are configured as low pass filters. The first frequency selective surface 226*a* has a stop band that is lower than the stop band of the second frequency selective surface 226*b*. Accordingly, the antenna element 104 in this example provides first 604, second 608, and third 612 frequency regions, with the first frequency region 604 having the largest volume, the second frequency region 608 having a volume between the first 604 and third 612 frequency regions, and with the third frequency region 612 having the smallest volume. Moreover, the first 604, second 608, and third 612 frequency regions correspond to antenna operations within first (lowest), second (next to lowest), and third (highest) frequency ranges respectively. More particularly, as can be appreciated by one of skill in the art after consideration of the present disclosure, when the antenna element 104 is in operation, signals within the first (lowest) frequency range access all of the first 604, second 608 and third 612 frequency regions; signals within the second (intermediate) frequency range access the second 608, and third 612 frequency regions; and signals within the third (highest) frequency range access only the third frequency region 612**.

The antenna element volume 232 of the antenna element 104 depicted in FIG. 6 can be filled with a dielectric material 228. For example, the first frequency selective surface **226*a* can be supported by a first portion of dielectric material 228.1, the second frequency selective surface 226*b* can be supported by a second portion of dielectric material 228.2, and the feed 208 can be supported by a third portion of dielectric material 228.3. Each portion of dielectric material 228 can be the same as or different than one or all of the other portions of dielectric material 228**.

Figure 7:
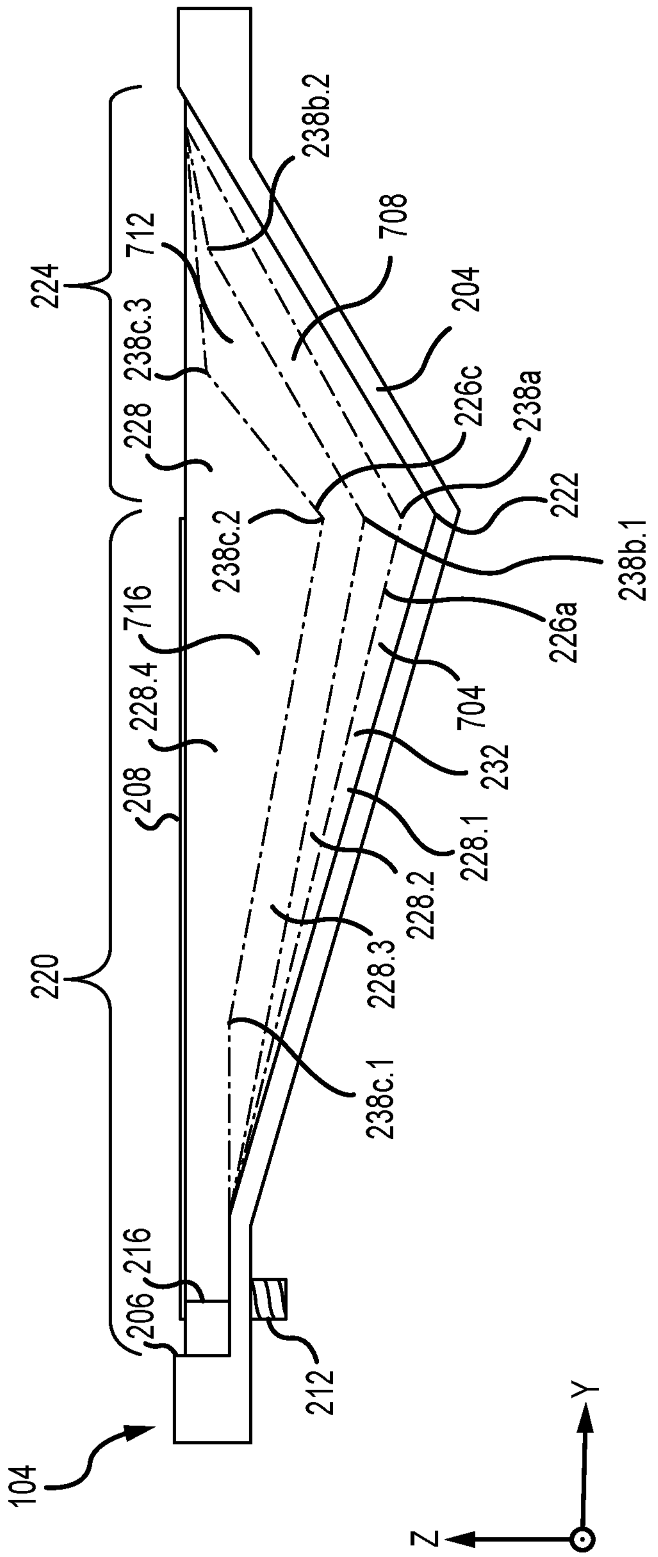
FIG. 7 is a cross-section in elevation of an antenna element in accordance with other embodiments of the present disclosure.

FIG. 7 depicts an example of an antenna element 104 in accordance with still other embodiments of the present disclosure. In this example, an antenna element 104 with first **226*a*, second 226*b*, and third 226*c* frequency selective surfaces is depicted. In accordance with embodiments of the present disclosure, the frequency selective surfaces 226*a*** to 226*c* are configured as low pass filters. The first frequency selective surface 226*a* has a stop band that is lower than the stop band of the second frequency selective surface 226*b*, which is lower than the stop band of the third frequency selective surface 226*c*. Accordingly, the antenna element 104 in this example provides first 704, second 708, third 712, and fourth 716 frequency regions, corresponding to antenna operations within first (lowest), second (next to lowest), third (next to highest), and fourth (highest) frequency ranges. In this example, when the antenna element 104 is in operation, signals within the first frequency range access all of the first 704, second 708, third 712, and fourth 716 frequency regions; signals within the second frequency range access the second 708, third 712, and fourth 716 frequency regions; signals within the third frequency range access the third 712 and fourth 716 frequency regions; and signals within the fourth frequency range access only the fourth frequency region 716.

The antenna element volume 232 of the antenna element 104 depicted in FIG. 7 can be filled with a dielectric material 228. For example, the first frequency selective surface 226*a* can be supported by a first portion of dielectric material 228.1, the second frequency selective surface 226*b* can be supported by a second portion of dielectric material 228.2, the third frequency selective surface 226*c* can be supported by a third portion of dielectric material 228.3, and the feed 208 can be supported by a fourth portion of dielectric material 228.4. Each portion of dielectric material 228 can be the same as or different than some or all of the other portions of dielectric material 228.

FIG. 7 also illustrates that an antenna element 104 in accordance with embodiments of the present disclosure can have one or more frequency selective surfaces 226 that have contours that do not follow the contours of the ground plane 204. For example, the second frequency selective surface 226*b* includes first 238*b*.1 and second 238*b*.2 lines of inflection, with the first line of inflection 238*b*.1 adjacent the line of inflection 222 of the ground plane 204 and the second line of inflection 238*b*.2 adjacent a distal end of the antenna element 104, within the lens region 224. As another example, the third frequency selective surface 226*c* includes first 238*c*.1, second 238*c*.2, and third 238*c*.3 lines of inflection, with the first line of inflection 238*c*.1 adjacent a proximal end of the antenna element 104, within the feed region 220, the second line of inflection 238*c*.2 adjacent the first line of inflection 238*b*.1 of the second frequency selective surface 226*b*, and the third line of inflection 238*c*.3 adjacent the distal end of the antenna element 104 and within the lens region 224.

Figure 8:
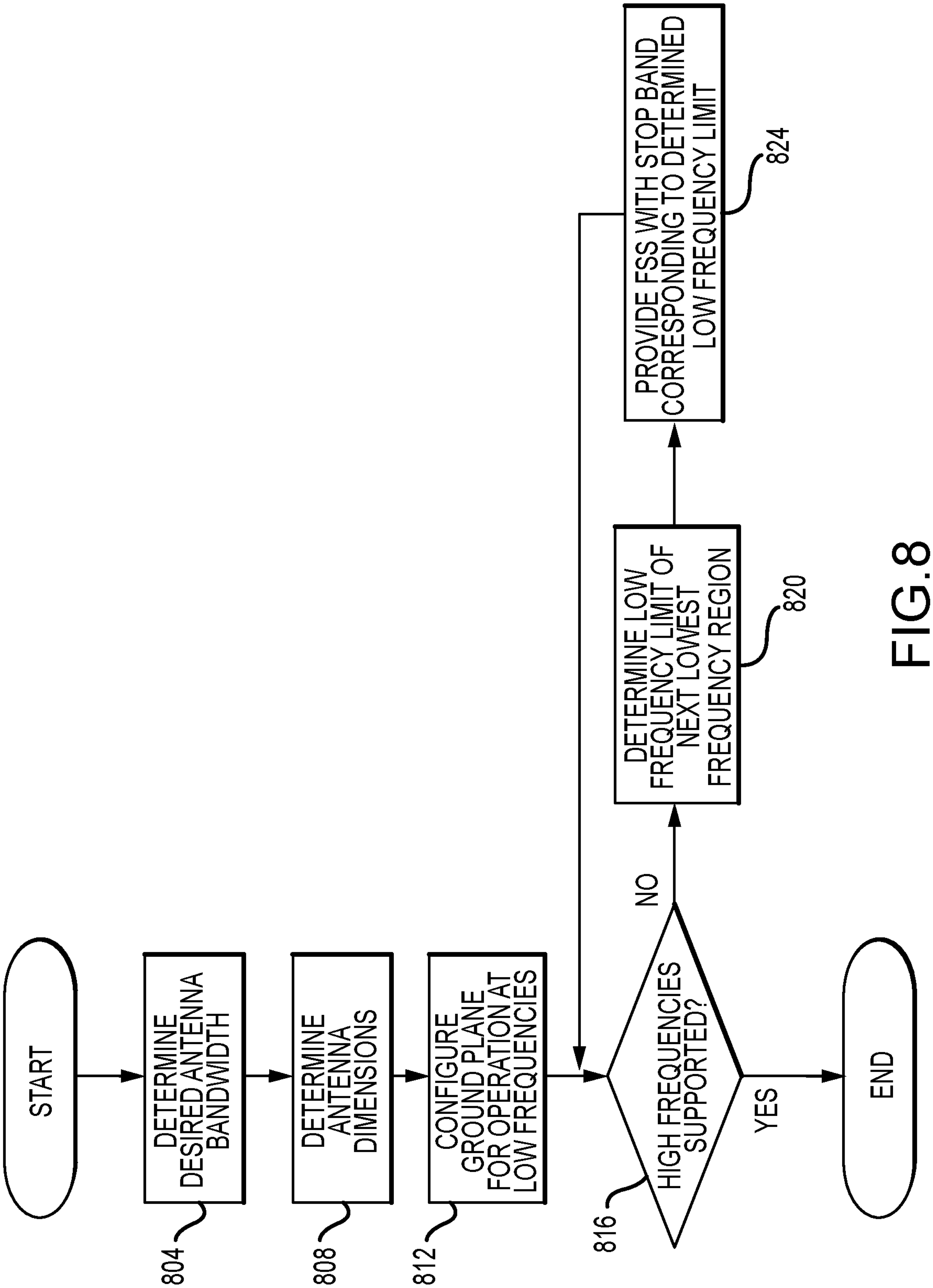
FIG. 8 is a flow chart illustrating aspects of a method for forming an antenna element in accordance with embodiments of the present disclosure.

FIG. 8 is a flow chart illustrating aspects of a method for providing an antenna element in accordance with embodiments of the present disclosure. Initially, at step 804, the desired antenna element 104 bandwidth is determined. The antenna element 104 dimensions are then determined (step 808). The dimensions of the antenna element 104 can take various factors into consideration, including but not limited to an available area on a vehicle 108 or other platform, the desired range of operating frequencies, the desired gain characteristics, or any other factors. As can be appreciated by one of skill in the art, the dimensions of the antenna element 104 may be determined with particular consideration to satisfactory operation at a lowest frequency within the determined antenna element 104 bandwidth.

At step 812, the area of the ground plane 204 forming the antenna element volume 232 is configured for operation at a range of frequencies encompassing or extending from a lowest frequency within the determined antenna element 104 bandwidth. This can include determining a maximum depth and contour of the antenna element volume 232 defined by the ground plane 204.

At step 816, a determination is made as to whether the frequencies within the determined bandwidth of the antenna element 104, above the range of frequencies encompassing the lowest frequency, are adequately supported. If higher frequencies are not adequately supported, the process proceeds to the determination of a low frequency limit of the next lowest frequency region (step 820). In particular, the frequency at which the performance of the antenna element 104 becomes unsatisfactory or is about to become unsatisfactory is identified. A frequency selective surface 226 with a stop band corresponding to the determined low frequency limit is then provided for placement between the feed 208 and portions of the ground plane 204 (step 824). Providing the frequency selective surface 226 can include providing a frequency selective surface 226 with the desired stop band, and determining a depth and contour of the frequency selective surface 226 that will provide the appropriate antenna characteristics for at least frequencies at or immediately above that stop band.

The process then returns to step 816, and a determination is again made as to whether the frequencies within the determined bandwidth of the antenna element 104, above the range of frequencies encompassing the frequency corresponding to the previously provided frequency selective surface 226, are supported. If support for the higher frequencies is now present, the process can end, otherwise, the process can return to step 820 and a next low frequency limit can be selected. Once adequate performance across the entire operating bandwidth of the antenna element 104 is achieved, the process can end.

Figure 9B:
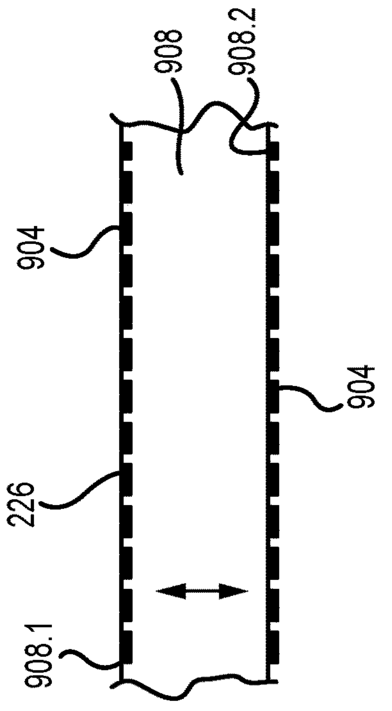
FIGS. 9A and 9B are plan and cross-sectional views respectively of a frequency selective surface that can be incorporated into an antenna element in accordance with embodiments of the present disclosure.
Figure 9A:
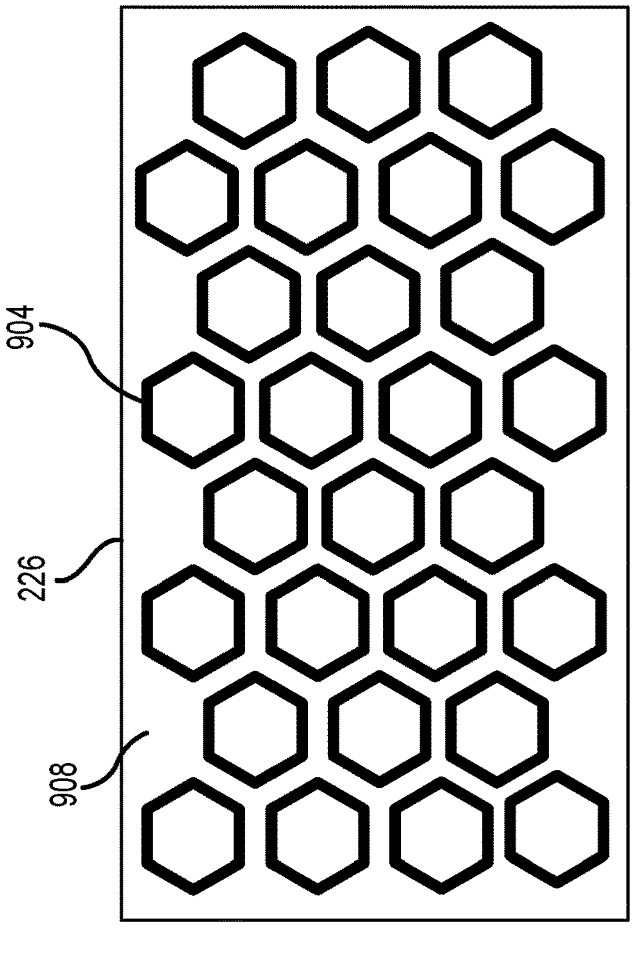

FIGS. 9A and 9B depict an example configuration of a frequency selective surface 226 suitable for use in connection with embodiments of the present disclosure in plan and elevation views respectively. In this example, a periodic pattern of electrically conductive hexagonal elements 904 are disposed on opposite surfaces 908.1 and 908.2 of a sheet of dielectric material 908. The electrical diameter of each hexagonal element 904 is approximately equal to one wavelength at the desired cutoff frequency. The spacing between the opposite surfaces 908.1 and 908.2 can be approximately equal to ¼ a wavelength at the desired cut off frequency. In addition, the spacing between adjacent hexagonal elements 904 can be approximately equal to ¼ the wavelength at the desired cut off frequency. As can be appreciated by one of skill in the art after consideration of the present disclosure, other low pass frequency selective surface configurations are possible and can be included in embodiments of the present disclosure.

Embodiments of the present disclosure provide antenna element 104 structures and methods that enable an embedded surface wave type antenna to effectively operate over a wider range of frequencies than might otherwise be possible. In at least some embodiments, portions of dielectric material 228 disposed within the antenna element volume 232 can have different dielectric or other properties to assist in obtaining desired antenna 104 performance characteristics. However, in at least some other embodiments, the structures and methods provided herein allow the use of a monolithic dielectric material 228, or at least the same dielectric material 228 throughout the antenna volume 232, as opposed to needing to provide dielectric materials having different bulk material properties in order to achieve desired performance over an extended bandwidth.

Although embodiments of the present disclosure discussed herein have included a ground plane 204 that extends to a line of inflection 222, and has also discussed frequency selective surfaces 226 having a line of inflection 238, other embodiments of the present disclosure can be alternately configured. For example, one, some, or all of the included ground plane 204 and the included frequency selective surface or surfaces 226 can be arched or curved in one or more dimensions as it or they extend along the length of the antenna element 104.

In addition, by utilizing different surfaces, provided by the ground plane 204 and by one or more frequency selective surfaces 226 disposed between the ground plane 204 and the feed 208, different launch angles for electromagnetic waves of different frequencies can be enabled by embodiments of the present disclosure. This in turn allows for a more stable far field beam across the entire frequency band.

The foregoing disclosure has been presented for purposes of illustration and description. Further, the description is not intended to limit the disclosure to the form disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosure and to enable others skilled in the art to utilize the disclosure in such or in other embodiments and with the various modifications required by their particular application or use of the disclosure. It is intended that the appended claims be construed to include alternative embodiments to the extent permitted by the prior art.

What is claimed is:

1. An antenna element, comprising:

a ground plane, wherein the ground plane defines at least some boundaries of an antenna element volume, and wherein the ground plane defines an aperture;

a feed, wherein the feed extends over a portion of a first side of the antenna element volume and wherein the feed is disposed within an area of the aperture in a plan view; and a first frequency selective surface, wherein the first frequency selective surface is disposed between at least a portion of the ground plane and the feed, wherein, within the area of the aperture in the plan view and moving along an area adjacent the feed and towards a distal region, a distance between the ground plane and a plane containing the feed increases, and wherein, within the area of the aperture in the plan view and moving away from the feed and towards the distal region, the distance between the ground plane and the plane containing the feed decreases.

2. The antenna element of claim 1, wherein the first frequency selective surface is configured to pass a signal having a frequency within a first frequency range and to reflect a signal within a second frequency range, and wherein the first frequency range is lower than the second frequency range.

3. The antenna element of claim 2, the ground plane further defines an aperture, and wherein the feed is disposed within the aperture.

4. The antenna element of claim 1, wherein the antenna element includes a plurality of frequency selective surfaces.

5. The antenna element of claim 1, wherein the feed includes a transverse electromagnetic flair section.

6. An antenna element, comprising:

a ground plane, wherein the ground plane defines at least some boundaries of an antenna element volume;

a feed, wherein the feed extends over a portion of a first side of the antenna element volume;

a first frequency selective surface, wherein the first frequency selective surface is disposed between at least a portion of the ground plane and the feed; and a second frequency selective surface, wherein the first frequency selective surface is configured to pass a signal having a frequency within a first frequency range and to reflect a signal within a second frequency range, wherein the first frequency range is lower than the second frequency range, and wherein the second frequency selective surface is configured to pass a signal having a frequency within the second frequency range and to reflect a signal within a third frequency range.

7. The antenna element of claim 6, wherein the second frequency range is lower than the third frequency range.

8. The antenna element of claim 7, wherein the first frequency selective surface is disposed between the second frequency selective surface and the ground plane.

9. The antenna element of claim 8, further comprising:

a third frequency selective surface, wherein the third frequency selective surface is configured to pass a signal having a frequency within the third frequency range and to reflect a signal within a fourth frequency range, wherein the third frequency range is lower than the fourth frequency range.

10. The antenna element of claim 7, further comprising:

a signal line, wherein the signal line is joined to a proximal end of the feed.

11. An antenna element, comprising:

a ground plane, wherein the ground plane defines at least some boundaries of an antenna element volume;

a feed, wherein the feed extends over a portion of a first side of the antenna element volume;

a first frequency selective surface, wherein the first frequency selective surface is disposed between at least a portion of the ground plane and the feed; and a dielectric material, wherein the dielectric material is disposed within the antenna element volume, and wherein at least a first portion of the dielectric material is between the first frequency selective surface and the ground plane.

12. The antenna element of claim 11, wherein the ground plane further defines an aperture, and wherein the feed is disposed within the aperture.

13. The antenna element of claim 12, wherein, within an area of the aperture in a plan view and moving through a feed region and towards a lens region, a distance between the ground plane and a plane containing the feed increases, and wherein, within the area of the aperture in the plan view and moving through the lens region and away from the feed region, the distance between the ground plane and the plane containing the feed decreases.

14. The antenna element of claim 13, wherein a line of inflection is formed in the ground plane at a boundary between the feed region and the lens region.

15. The antenna element of claim 13, wherein, within at least most of the feed region, a distance between the first frequency selective surface and the feed increases with decreased proximity to the lens region, and wherein, within at least most of the lens region, the distance between the first frequency selective surface and the feed decreases with increased distance from the feed region.

16. The antenna element of claim 13, wherein a line of inflection is formed in the ground plane at a boundary between the feed region and the lens region.

17. The antenna element of claim 13, wherein, within at least most of the feed region, a distance between the first frequency selective surface and the feed increases with decreased proximity to the lens region, and wherein, within at least most of the lens region, the distance between the first frequency selective surface and the feed decreases with increased distance from the feed region.

18. The antenna element of claim 11, wherein at least a second portion of the dielectric material is disposed between the first frequency selective surface and the feed.

19. The antenna element of claim 11, wherein the first frequency selective surface is configured to pass a signal having a frequency within a first frequency range and to reflect a signal within a second frequency range, and wherein the first frequency range is lower than the second frequency range.

20. The antenna element of claim 11, wherein the feed includes a transverse electromagnetic flair section.

* * * * *